US009937588B2

United States Patent
Fukuda et al.

(10) Patent No.: US 9,937,588 B2
(45) Date of Patent: Apr. 10, 2018

(54) FRICTION STIR WELDING METHOD

(71) Applicant: UACJ CORPORATION, Tokyo (JP)

(72) Inventors: Toshihiko Fukuda, Nagoya (JP); Satoshi Miyazaki, Nagoya (JP)

(73) Assignee: UACJ Corporation, Tokyo (JP)

( * ) Notice: Subject to any disclaimer, the term of this patent is extended or adjusted under 35 U.S.C. 154(b) by 101 days.

(21) Appl. No.: 15/014,338

(22) Filed: Feb. 3, 2016

(65) Prior Publication Data

US 2016/0151855 A1 Jun. 2, 2016

Related U.S. Application Data

(63) Continuation of application No. PCT/JP2014/070732, filed on Aug. 6, 2014.

(30) Foreign Application Priority Data

Aug. 13, 2013 (JP) .................................. 2013-168060
Aug. 13, 2013 (JP) .................................. 2013-168061

(51) Int. Cl.
*B23K 20/12* (2006.01)
*B23K 20/233* (2006.01)
(Continued)

(52) U.S. Cl.
CPC ........ *B23K 20/2336* (2013.01); *B23K 20/122* (2013.01); *B23K 20/124* (2013.01);
(Continued)

(58) Field of Classification Search
None
See application file for complete search history.

(56) References Cited

U.S. PATENT DOCUMENTS 5,794,835 A † 8/1998 Colligan
6,715,664 B2 * 4/2004 Yamashita ........... B23K 20/124
228/112.1

(Continued)

FOREIGN PATENT DOCUMENTS

JP 04-071634 B2 11/1992
JP 07-505090 A1 6/1995
(Continued)

OTHER PUBLICATIONS

International Search Report and Written Opinion (Application No. PCT/JP2014/070732) dated Sep. 9, 2014.
U.S. Appl. No. 15/014,366, filed Feb. 3, 2016, Fukuda et al.

Primary Examiner — Devang R Patel
(74) Attorney, Agent, or Firm — Burr & Brown, PLLC

(57) ABSTRACT

A friction stir welding method which permits advantageous production of a product which has a sound welded area without joint defects, by joining together two members formed of the same material or respective different materials selected from a cast aluminum alloy and 2000 series, 4000 series, 5000 series and 7000 series aluminum alloys which are considered difficult to be joined together by the friction stir welding method. An initiation tab member formed of a 1000 series, 3000 series, 6000 series or 8000 series aluminum alloy is disposed in abutting contact with end faces of joining portions of first and second members (in an abutting part), on the side of initiation of the welding operation, and the friction stir welding operation is performed by moving a probe of a rotary tool through the initiation tab member into the joining portions of the two members.

8 Claims, 6 Drawing Sheets

(51) Int. Cl.
*B23K 101/18* (2006.01)
*B23K 101/28* (2006.01)
*B23K 103/10* (2006.01)
*B23K 103/18* (2006.01)

(52) U.S. Cl.
CPC ........ *B23K 20/129* (2013.01); *B23K 20/1245* (2013.01); *B23K 20/1255* (2013.01); *B23K 2201/18* (2013.01); *B23K 2201/28* (2013.01); *B23K 2203/10* (2013.01); *B23K 2203/18* (2013.01)

(56) References Cited

U.S. PATENT DOCUMENTS

| | | | | |
|---|---|---|---|---|
| 2003/0217452 | A1* | 11/2003 | Talwar | B23K 20/122 29/402.14 |
| 2004/0035914 | A1* | 2/2004 | Hempstead | B23K 20/1265 228/112.1 |
| 2004/0084506 | A1* | 5/2004 | Tanaka | B23K 20/124 228/112.1 |
| 2005/0082342 | A1* | 4/2005 | Babb | B23K 20/1225 228/112.1 |
| 2007/0226977 | A1* | 10/2007 | Stern | B23Q 3/06 29/33 K |
| 2010/0096438 | A1* | 4/2010 | Sato | B23K 20/1225 228/114 |
| 2014/0027497 | A1* | 1/2014 | Rowland | F16L 9/02 228/114 |

FOREIGN PATENT DOCUMENTS

| | | |
|---|---|---|
| JP | 10-071477 A1 | 3/1998 |
| JP | 2002-248582 A1 | 9/2002 |
| JP | 2002248582 A * | 9/2002 |
| JP | 2003-154471 A1 | 5/2003 |
| JP | 2003-181654 A1 | 7/2003 |
| JP | 2005-074518 A1 | 3/2005 |
| JP | 2005066669 A * | 3/2005 |
| JP | 2007-061877 A1 | 3/2007 |
| JP | 4004259 B2 | 11/2007 |
| JP | 2009-018312 A1 | 1/2009 |
| WO | 93/10935 A1 | 6/1993 |

\* cited by examiner
† cited by third party

FRICTION STIR WELDING METHOD

CROSS REFERENCE TO RELATED APPLICATION

This application is a continuation of the International Application No. PCT/JP2014/070732 filed on Aug. 6, 2014, which claims the benefit under 35 U.S.C. § 119(a)-(d) of Japanese Application No. 2013-168060 filed on Aug. 13, 2013 and Japanese Application No. 2013-168061 filed on Aug. 13, 2013, the entireties of which are incorporated herein by reference.

BACKGROUND OF THE INVENTION

Field of the Invention

The present invention relates to a friction stir welding method, and more particularly to a method of advantageously joining together members formed of materials which are considered difficult to be joined together by the friction stir welding method, such as a cast aluminum alloy and 2000 series, 4000 series, 5000 series and 7000 series aluminum alloys, by the friction stir welding method using a rotary tool such as a bobbin tool and a self-reacting tool, which has two shoulder members and which is configured to perform a friction stir welding operation so that the members to be joined together are interposed between the two shoulder members, and a pressure is applied to those members through the two shoulder members.

Description of Related Art

A friction stir welding (FSW) method has been recently proposed in JP-T-7-505090, for example. The friction stir welding method is performed by inserting a rotary tool (specifically, a probe or a pin) into portions of two members to be joined together while rotating the rotary tool, to stir materials of those members and force the materials to flow by utilizing a friction heat, whereby those members are joined together in solid states without their fusion. A thermal strain is not likely to be generated by the friction stir welding method, since an amount of heat generated in an area welded by the friction stir welding method is smaller than an amount of heat generated in an area welded by a conventional fusion welding method. Further, the friction stir welding method permits joining of the members in the solid states, without phase transition which is characteristic of the fusion welding method in which the members to be joined together are molten and then solidified. For the above-described reasons, the friction stir welding method permits formation of a sound welded area. Accordingly, the friction stir welding method has been attracting attention, and employed in wider fields, particularly for joining together members formed of aluminum materials. The friction stir welding method greatly contributes to an increase of applications of the aluminum materials which are frontrunner materials that permit weight reduction. For instance, the aluminum materials can be used for structural members of transportation vehicles such as an automobile and a railway car, and housings of IT equipment, by performing the friction stir welding method for production of the structural members and housings.

By the way, the rotary tool used in the friction stir welding method described above generally has a structure in which a protrusion which is called the probe and which has a predetermined length is provided in a central part of a distal end portion of a cylindrical shoulder member. The friction stir welding method is performed by inserting a distal end of the probe into portions of the members to be joined together while rotating the shoulder member of the rotary tool about its axis, and joining together those members along a line or at a spot while applying a pressure to the above-described portions through a shoulder surface of the shoulder member, as disclosed in JP-T-7-505090 described above. However, in the friction stir welding method using the rotary tool constructed as described above, it is necessary to dispose a backing plate such as a surface plate on the back side of the portions which are to be joined together and into which the probe is to be inserted, so that a pressing force applied by the rotary tool to the above-described portions during the joining operation is received by the backing plate. Otherwise, the members to be joined together would be deformed by the pressure applied by the rotary tool, giving rise to a problem of failure of joining of those members. Therefore, it has been difficult to employ the friction stir welding method for joining of hollow members, since it is difficult to dispose the backing plate with respect to the hollow members.

Under the above-described circumstances, there has been proposed a rotary tool which does not require the use of the backing plate. The rotary tool has a cylindrical first shoulder member, and a second shoulder member which is provided at the distal end of the probe projecting from the first shoulder member, and which is opposed to the first shoulder member. The rotary tool is configured to perform a friction stir welding operation by simultaneously applying a pressure to both of the front and back surfaces of the portions of the members to be joined together, through the respective two shoulder members described above. For instance, there has been disclosed a friction stir welding method using a so-called bobbin tool having a structure in which the two shoulder members are fixedly connected with each other through the probe, in JP-A-2003-154471, for example. Further, JP-A-2003-181654 and JP-A-2009-18312, for example, propose so-called self-reacting tools in which one of the two shoulder members is configured so as to be movable with respect to the probe in its axial direction, so that a distance between the two shoulder members can be changed. By using the rotary tools described above, the hollow members and the like can be joined together without using the backing plate, whereby applications of the friction stir welding method have been further increased.

By the way, among aluminum members to be joined together, members formed of a cast aluminum alloy and 2000 series, 4000 series, 5000 series and 7000 series aluminum alloys according to JIS are considered difficult to be joined together by the friction stir welding method, since metals of those members are difficult to be friction-stirred, and are not sufficiently forced to flow by a friction-stirring action. Therefore, in the case where the above-indicated aluminum members are joined together by the friction stir welding method by using the rotary tool having the two shoulder members, such as the bobbin tool and self-reacting tool described above, the metals of those aluminum members do not sufficiently flow toward the rear side of the rotary tool as seen in the direction in which the welding operation proceeds. Accordingly, a hole not filled with the metals is generated in the welded area (joint) formed by the above-described welding operation, or the welded area has defects such as an unwelded part or an insufficiently welded part, resulting in failure of formation of a sound welded area. Further, the welded area formed by the above-described welding operation suffers from considerable formation of burr, resulting in deterioration of the appearance of the welded area, for example.

SUMMARY OF THE INVENTION

The present invention was made in view of the background arts described above. It is an object of the invention to provide a method which permits advantageous production of a product having a sound welded area without joint defects, by joining together two members formed of the same material or respective different materials selected from a cast aluminum alloy and 2000 series, 4000 series, 5000 series and 7000 series aluminum alloys which are considered difficult to be joined together by a friction stir welding method, by performing a friction stir welding operation using a rotary tool having two shoulder members.

The above-described object can be achieved according to the principle of the invention, which provides a friction stir welding method comprising: joining together joining portions of a first member and a second member by a friction stir welding operation performed by moving a probe of a rotary tool in a welding direction, while rotating the probe in the form of a rod by rotation of the rotary tool together with two shoulder members which are provided on the probe so as to be spaced apart from each other by a predetermined distance in an axial direction of the probe, and applying a pressure to the joining portions through the two shoulder members, wherein the first and second members are formed of the same material or respective different materials selected from a group consisting of a cast aluminum alloy and 2000 series, 4000 series, 5000 series and 7000 series aluminum alloys; disposing an initiation tab member formed of a 1000 series, 3000 series, 6000 series or 8000 series aluminum alloy in abutting contact with end faces of the joining portions of the first and second members on the side of initiation of the friction stir welding operation; and moving the probe of the rotary tool into the joining portions of the first and second members through the initiation tab member to perform the friction stir welding operation with respect to the above-described joining portions.

In a preferred form of the friction stir welding method according to the invention, the initiation tab member is a planar member having a length not shorter than four times a diameter of the shoulder members, in the direction of welding of the first and second members by the rotary tool, and a width not shorter than twice the diameter of the shoulder members, in a direction perpendicular to the direction of welding of the first and second members.

In other preferred form of the friction stir welding method according to the invention, a diameter of the probe of the rotary tool is not smaller than twice a thickness of the initiation tab member.

The friction stir welding method according to the invention is practiced, for example, by butting the joining portions of the first and second members on each other to provide an abutting part, and performing the friction stir welding operation with respect to the abutting part. Alternatively, the friction stir welding method according to the invention is practiced by superposing the joining portions of the first and second members on each other, and performing the friction stir welding operation with respect to an overlapping part in which the joining portions are superposed on each other.

The rotary tool preferably used in the present invention is generally a bobbin tool in which the two shoulder members are fixedly provided on the probe, with the predetermined distance therebetween. Alternatively, the rotary tool preferably used in the present invention is a self-reacting tool in which one of the two shoulder members is fixed to the probe, and the other of the two shoulder members is configured so as to be movable in the axial direction of the probe, so that the distance between the two shoulder members can be changed.

In an advantageous embodiment of the invention, the friction stir welding method further comprises: disposing a termination tab member formed of a 1000 series, 3000 series, 6000 series or 8000 series aluminum alloy in abutting contact with end faces of the joining portions of the first and second members on the side of termination of the friction stir welding operation; and terminating the friction stir welding operation by successively moving the probe of the rotary tool from the joining portions of the first and second members into the termination tab member to form a continuous friction-stir-welded area extending across the above-described joining portions and the above-described termination tab member.

In a preferred form of the friction stir welding method according to the above-described embodiment of the invention, the termination tab member is a planar member having a length not shorter than four times a diameter of the shoulder members, in the direction of welding of the first and second members by the rotary tool, and a width not shorter than twice the diameter of the shoulder members, in a direction perpendicular to the direction of welding of the first and second members.

The termination tab member advantageously has a thickness not larger than a half of a diameter of the probe of the rotary tool.

In the present invention, when the joining portions of the members formed of the specific aluminum materials which are not easily joined together by the friction stir welding method are joined together by the friction stir welding method using the rotary tool having the two shoulder members, the initiation tab member formed of one of 1000 series, 3000 series, 6000 series and 8000 series aluminum alloys according to JIS, whose metals can be easily stirred, is disposed in abutting contact with the end faces of the above-described joining portions of the members on the side of initiation of the welding operation, and the probe of the rotary tool is moved through the initiation tab member into the above-described joining portions. Accordingly, when the friction stir welding operation is started, the metal of the initiation tab member can be easily forced to flow toward the rear side of the rotary tool as seen in the direction of its movement relative to the initiation tab member. Under the state wherein the metal of the initiation tab member is effectively forced to flow toward the rear side of the rotary tool, as described above, the rotary tool is moved into the joining portions of the members formed of the specific aluminum materials which are not easily joined together by the friction stir welding method.

Subsequently, in the joining portions of the members formed of the specific aluminum materials which are not easily joined together by the friction stir welding method, the metals of those members are friction-stirred by the probe of the rotary tool, and effectively forced to flow toward the rear side of the rotary tool as seen in the direction of its movement relative to the above-described joining portions of the members, whereby the friction stir welding operation can be effectively performed to permit formation of a welded area (joint) on the rear side of the rotary tool without generation of a void which is not sufficiently filled with the metals, and without occurrence of joint defects such as an unwelded part and an insufficiently welded part. Thus, the present invention permits advantageous production of a product having a sound welded area which does not suffer from generation of a hole and occurrence of the joint defects. Further, the present invention permits an effective improvement of fluidity of the metals in the joining portions of the members whose specific aluminum materials are not easily friction-stirred, to advantageously solve a problem of extrusion or discharge of excess metals toward the surfaces of the welded area, and resultant formation of the burr.

BRIEF DESCRIPTION OF THE DRAWINGS

FIG. 5 are schematic axial cross sectional views showing examples of the rotary tool used in the invention, in which

DETAILED DESCRIPTION OF THE INVENTION

To clarify the invention more specifically, a friction stir welding method according to the invention will be described by reference to the drawings.

Figure 1:
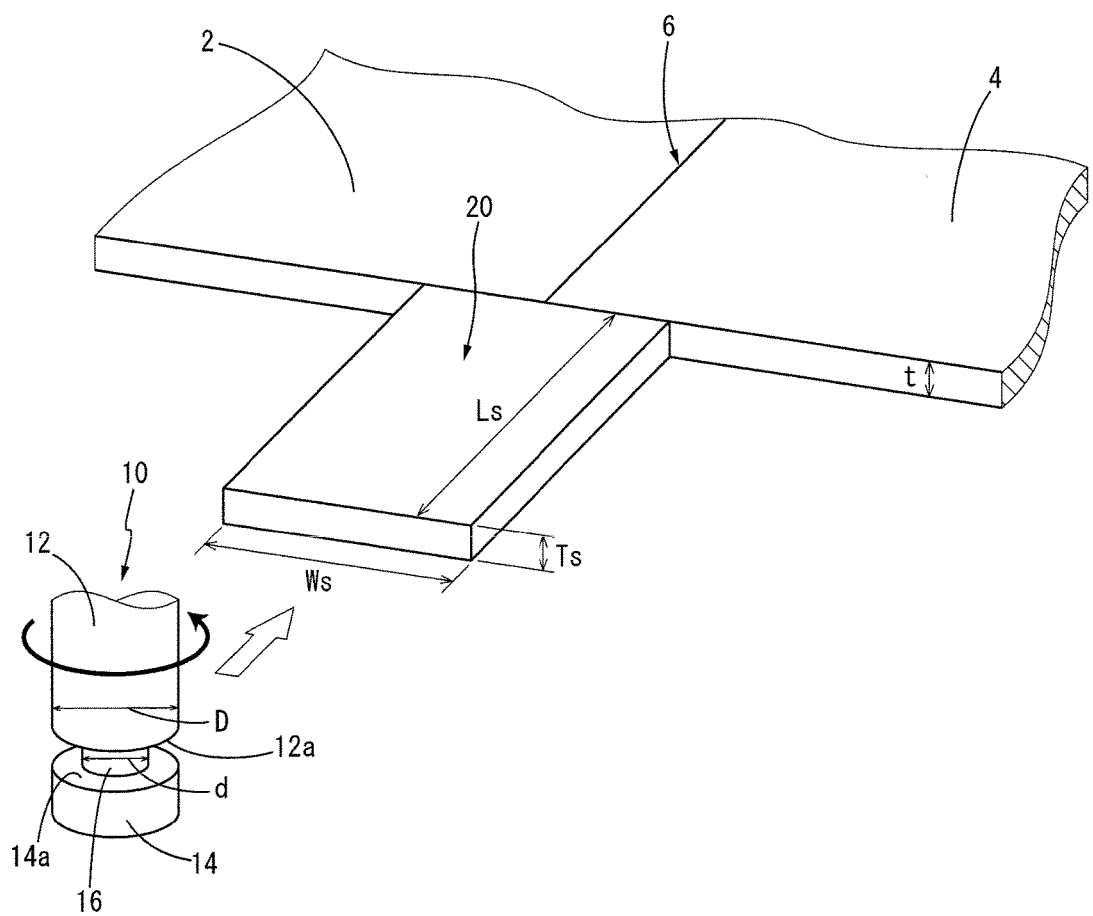
FIG. 1 is a schematic perspective view showing a state before initiation of a welding operation in a friction stir welding method according to the invention, on the side of initiation of the welding operation.

Referring first to FIG. 1, there is shown a state of the friction stir welding method according to the invention on the side of initiation of a welding operation. In the embodiment shown in FIG. 1, a first member 2 and a second member 4 are butted on each other in their planar portions to form an abutting part 6, and the friction stir welding operation is performed with respect to the abutting part 6, whereby the first and second members 2 and 4 are joined together along a line, to obtain a product in the form of a one-piece body of those members 2 and 4.

Each of the first and second members 2 and 4 to be joined together is formed of any one of a cast aluminum alloy, a 2000 series (Al—Cu-based) aluminum alloy, a 4000 series (Al—Si-based) aluminum alloy, a 5000 series (Al—Mg-based) aluminum alloy and a 7000 series (Al—Zn—Mg-based) aluminum alloy according to JIS, which materials are difficult to be joined together. The first and second members 2 and 4 may be formed of the same material or respective different materials. As the member formed of the cast aluminum alloy, there is used a cast member which has a planar portion and which is obtained by a conventional casting process by using an aluminum alloy represented by "AC" and a digit and an alphabetic character or characters following "AC", according to JIS, and a cast member which has a planar portion and which is obtained by a die casting process by using an aluminum alloy represented by "ADC" and a digit or digits following "ADC", according to JIS, for example. On the other hand, the members formed of the 2000 series, 4000 series, 5000 series and 7000 series aluminum alloys indicated above are used in the form of various wrought products having a planar portion, such as a rolled sheet member and an extruded member.

A rotary tool 10 as shown in FIG. 1 is used in the friction stir welding method, to join together joining portions of the above-described first and second members 2 and 4 which cooperate to provide the abutting part 6. Namely, the rotary tool 10 is a bobbin type tool having a structure similar to that of the conventional bobbin type tool. The rotary tool 10 used in this embodiment has an upper shoulder member 12 and a lower shoulder member 14, which have the same diameter (D), and which are connected with each other through a probe 16 in the form of a rod, such that the upper and lower shoulder members 12 and 14 are coaxially opposed to each other with a predetermined distance therebetween, and integrally rotatable about their axes. Thus, the rotary tool 10 is configured such that the probe 16 is inserted into the abutting part 6 of the first and second members 2 and 4, while the probe 16 is rotated and while a pressure is applied to the abutting part 6 interposed between an upper shoulder surface 12a of the upper shoulder member 12 and a lower shoulder surface 14a of the lower shoulder member 14, in the downward and upward directions through the respective upper and lower shoulder surfaces 12a and 14a, whereby metals of the two members 2 and 4 are friction-stirred and forced to flow in the abutting part 6, and the two members 2 and 4 are joined together.

By the way, in the case where the probe 16 of the bobbin type rotary tool 10 described above is directly inserted into the abutting part 6 of the first and second members 2 and 4, and moved in the direction (welding direction) of extension of the abutting part 6 to join together the first and second members 2 and 4 along a line, the metals of the first and second members 2 and 4 do not sufficiently flow toward or are not sufficiently supplied to the rear side of the rotary tool 10 as seen in the direction of its movement relative to the first and second members 2 and 4, in end portions of those members 2 and 4 on the side of initiation of the welding operation, since the first and second members 2 and 4 are formed of the aluminum alloy materials which are not sufficiently forced to flow by a friction-stirring action. Accordingly, a void not filled with the metals is generated on the rear side of the rotary tool 10, resulting in generation of joint defects such as a hole not filled with the metals or an unwelded part, giving rise to difficulty in formation of a sound welded area. Further, the metals having low fluidity are extruded or discharged toward the surfaces of the members 2 and 4, resulting in considerable formation of burr in the welded area.

Therefore, in the present invention, in order to prevent the generation of the joint defects in the end portions of the members 2 and 4 on the side of initiation of the welding operation, and to reduce the considerable formation of the burr in the welded area, an initiation tab member 20 formed of a specific aluminum alloy material which is easily forced to flow by the friction-stirring action is disposed in abutting contact with end faces of the joining portions of the first and second members 2 and 4 (in the abutting part 6), on the side of initiation of the welding operation, as shown in FIG. 1, and the probe 16 of the bobbin type rotary tool 10 is moved and inserted into the joining portions of the first and second members 2 and 4 (into the abutting part 6) through the initiation tab member 20, and further moved in the welding direction to join together those members 2 and 4 along a line in the abutting part 6.

As the initiation tab member 20 disposed in abutting contact with the end faces of the joining portions of the members 2 and 4 on the side of initiation of the welding operation, there is used a member which is formed of a 1000 series aluminum alloy, a 3000 series aluminum alloy, a 6000 series aluminum alloy or an 8000 series aluminum alloy according to JIS, and which has a suitable shape and suitable dimensions. Generally, a rectangular member as shown in FIG. 1 is preferably used as the initiation tab member 20. All of the above-indicated specific aluminum alloys giving the initiation tab member 20 exhibit sufficiently high fluidity when they are friction-stirred. Therefore, by starting the friction stir welding operation from the initiation tab member 20 formed of the above-indicated material, and by moving the rotary tool 10 across the initiation tab member 20 into the abutting part 6 of the first and second members 2 and 4, the metal of the initiation tab member 20 easily flows toward the rear side of the rotary tool 10 as seen in the direction of its movement (welding direction), during the movement of the rotary tool 10, so that the metal of the initiation tab member 20 is supplied to the rear side of the rotary tool 10. Thus, the rotary tool 10 is moved and inserted into the abutting part 6 of the first and second members 2 and 4 without formation of a defective part in which the metal is not present.

Figure 2:
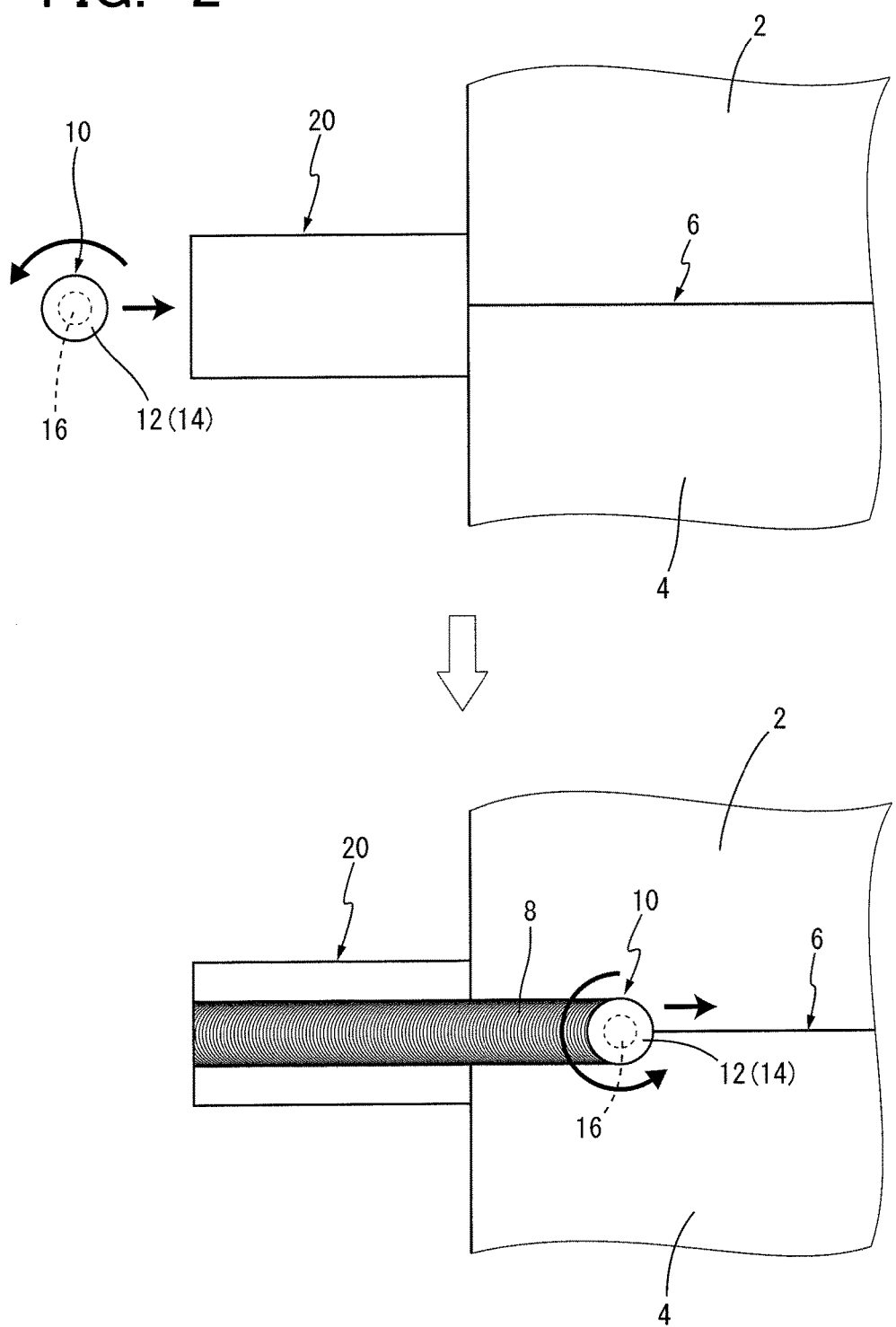
FIG. 2 is a schematic plan view showing a movement of a rotary tool on the side of initiation of the welding operation in the friction stir welding method according to the invention.

FIG. 2 shows a state in which the rotary tool 10 is moved through the initiation tab member 20 into the abutting part 6, while the initiation tab member 20 and the abutting part 6 are friction-stirred by the rotary tool 10. At this time, while the rotary tool 10 is rotated about its axis, the rotary tool 10 is inserted into the initiation tab member 20 from its end portion remote from the first and second members 2 and 4, and advanced relative to the initiation tab member 20 toward the abutting part 6 of the first and second members 2 and 4, while the initiation tab member 20 is friction-stirred by the rotary tool 10. Namely, the probe 16 is inserted into the initiation tab member 20 such that the end portion of the initiation tab member 20 is pressed into a gap (shown in FIG. 1) between the upper and lower shoulder surfaces 12a and 14a of the respective upper and lower shoulder members 12 and 14 of the rotary tool 10, and the initiation tab member 20 is friction-stirred by rotary motions of the two shoulder members 12 and 14 and the probe 16, while a pressure is applied to the initiation tab member 20 by the two shoulder members 12 and 14 having the respective shoulder surfaces 12a and 14a which are spaced apart from each other by a distance smaller by a suitable amount than the thickness of the initiation tab member 20. When the rotary tool 10 is moved relative to the initiation tab member 20 toward the abutting part 6 while the initiation tab member 20 is friction-stirred as described above, the metal of the initiation tab member 20 easily flows toward the rear side of the rotary tool 10 as seen in the direction of its movement, since the initiation tab member 20 is formed of the specific aluminum alloy material having a sufficiently high fluidity. Therefore, a sound friction-stirred area is formed on the rear side of the rotary tool 10 without generation of a defective part not filled with the metal.

When the rotary tool 10 has been moved across the initiation tab member 20, and reaches the abutting part 6 of the first and second members 2 and 4, the welding-start edge of the abutting part 6 is subjected to the friction-stirring action by the rotary motions of the two shoulder members 12 and 14 and the probe 16 of the rotary tool 10. At this time, the metal of the initiation tab member 20 is supplied to the rear side of the rotary tool 10 as seen in the direction of its movement, and no void exists on the rear side of the rotary tool 10. Accordingly, the metals of the first and second members 2 and 4 are effectively led toward the rear side of the rotary tool 10 as seen in the direction of its movement, along with the rotary motions of the two shoulder members 12 and 14 and the probe 16, whereby the metals are continuously advantageously supplied to the rear side of the rotary tool 10 as seen in the direction of its movement, even after the rotary tool 10 has been inserted into the abutting part 6 of the first and second members 2 and 4. Thus, it is possible to effectively prevent generation of a defective part which is not sufficiently filled with the metals, on the rear side of the rotary tool 10 as seen in the direction of its movement, whereby a sound friction-stir-welded area (joint) 8 is formed. Further, while the first and second members 2 and 4 are joined together in the abutting part 6 by the friction stir welding operation, the metals of those members 2 and 4 are effectively supplied to the rear side of the rotary tool 10, so that it is possible to advantageously reduce or prevent formation of burr due to extrusion or discharge of the metals of those members 2 and 4 to the periphery of the welded area 8.

By the way, the first and second members 2 and 4 to be subjected to the friction stir welding operation are generally butted on each other in their planar portions having the same thickness (t), to form the abutting part 6, and the thickness (Ts) of the initiation tab member 20 disposed in abutting contact with the end faces of those members 2 and 4 in the abutting part 6 on the side of initiation of the welding operation is set so as to be substantially equal to the thickness (t) of the first and second members 2 and 4 in the abutting part 6. Although the dimensions of the initiation tab member 20 are adequately selected such that the object of the invention can be achieved, the length (Ls) of the initiation tab member 20 in the direction of extension of the abutting part 6, i.e. in the direction of welding of the first and second members 2 and 4 shown in FIG. 1 is preferably set so as to be not shorter than four times the diameter (D) of the shoulder members 12 and 14 of the rotary tool 10, in other words, not shorter than four times the diameter of the shoulder surfaces 12a and 14a of the respective shoulder members 12 and 14. Further, the width (Ws) of the initiation tab member 20 in the direction perpendicular to the direction of its length (Ls) in the welding direction is preferably set so as to be not shorter than twice the diameter (D) of the shoulder members 12 and 14 of the rotary tool 10. The size and shape of the initiation tab member 20 are adequately determined so as to meet the above-described requirements regarding its length (Ls) and width (Ws). Further, the diameter (d) of the probe 16 of the rotary tool 10 is preferably set so as to be not smaller than twice the thickness (Ts) of the initiation tab member 20, whereby the friction stir welding operation according to the invention can be more advantageously performed.

In this embodiment, the shoulder members 12 and 14 of the rotary tool 10 have the same diameter. However, it is also possible to set the diameters of the shoulder members 12 and 14 at respective different values. In this case, it is desirable to set the diameter of the upper shoulder member 12 so as to be larger than that of the lower shoulder member 14. Where the diameters of the shoulder members 12 and 14 are different from each other, the diameter of one of the two shoulder members 12 and 14 whose shoulder surface has a larger diameter than the shoulder surface of the other of the two shoulder members 12 and 14 is defined as the diameter (D) described above. The above-described diameter (D) of the shoulder members 12 and 14 is generally set so as to be larger than the diameter (d) of the probe 16 by at least 4 mm. Further, in the case where the diameters of the shoulder members 12 and 14 are set at respective different values as described above, the diameter of one (shoulder member 14) of the two shoulder members 12 and 14 which is smaller than that of the other of the two shoulder members is set so as to be not smaller than a sum of the diameter (d) of the probe 16 and 2 mm.

Figure 3:
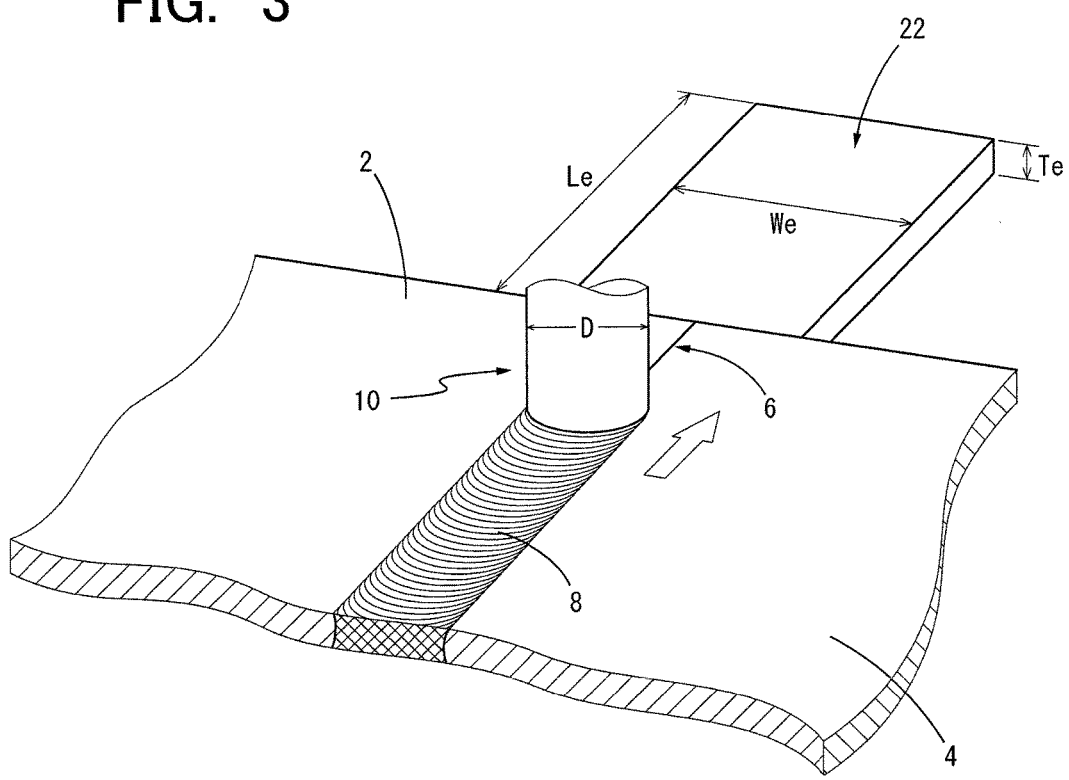
FIG. 3 is a schematic perspective view showing an example of a state of the friction stir welding method according to the invention, on the side of termination of the welding operation.

By the way, while the friction stir welding operation is performed with respect to the abutting part 6 of the first and second members 2 and 4 whose metals are not easily friction-stirred, the metals of the first and second members 2 and 4 tend to stick to the circumferential surface of the probe 16 of the rotary tool 10. Accordingly, when the friction stir welding operation is terminated and the rotary tool 10 is removed from the abutting part 6, the metals adhere or firmly stick to the shoulder surfaces 12a and 14a and the circumferential surface of the probe 16 of the rotary tool 10, so that an extra work is required to remove the metals. Therefore, it is advantageous to dispose a planar termination tab member 22 formed of an aluminum alloy material similar to that of the initiation tab member 20 described above, on the side of termination of the welding operation, as shown in FIG. 3, and move the probe 16 of the rotary tool 10 from the abutting part 6 into the termination tab member 22 to terminate the friction stir welding operation.

As the termination tab member 22, there is used a planar member formed of a 1000 series aluminum alloy (pure aluminum), a 3000 series (Al—Mn-based) aluminum alloy, a 6000 series (Al—Mg—Si-based) aluminum alloy or an 8000 series aluminum alloy according to JIS. By disposing the termination tab member 22 in abutting contact with end faces of the first and second members 2 and 4 (joining portions) in the abutting part 6, on the side of termination of the welding operation, and moving the probe 16 of the rotary tool 10 into the termination tab member 22, the metals firmly sticking to the circumferential surface of the probe 16 or the other parts of the rotary tool 10 are removed while the rotary tool 10 is moved through the termination tab member 22.

Figure 4:
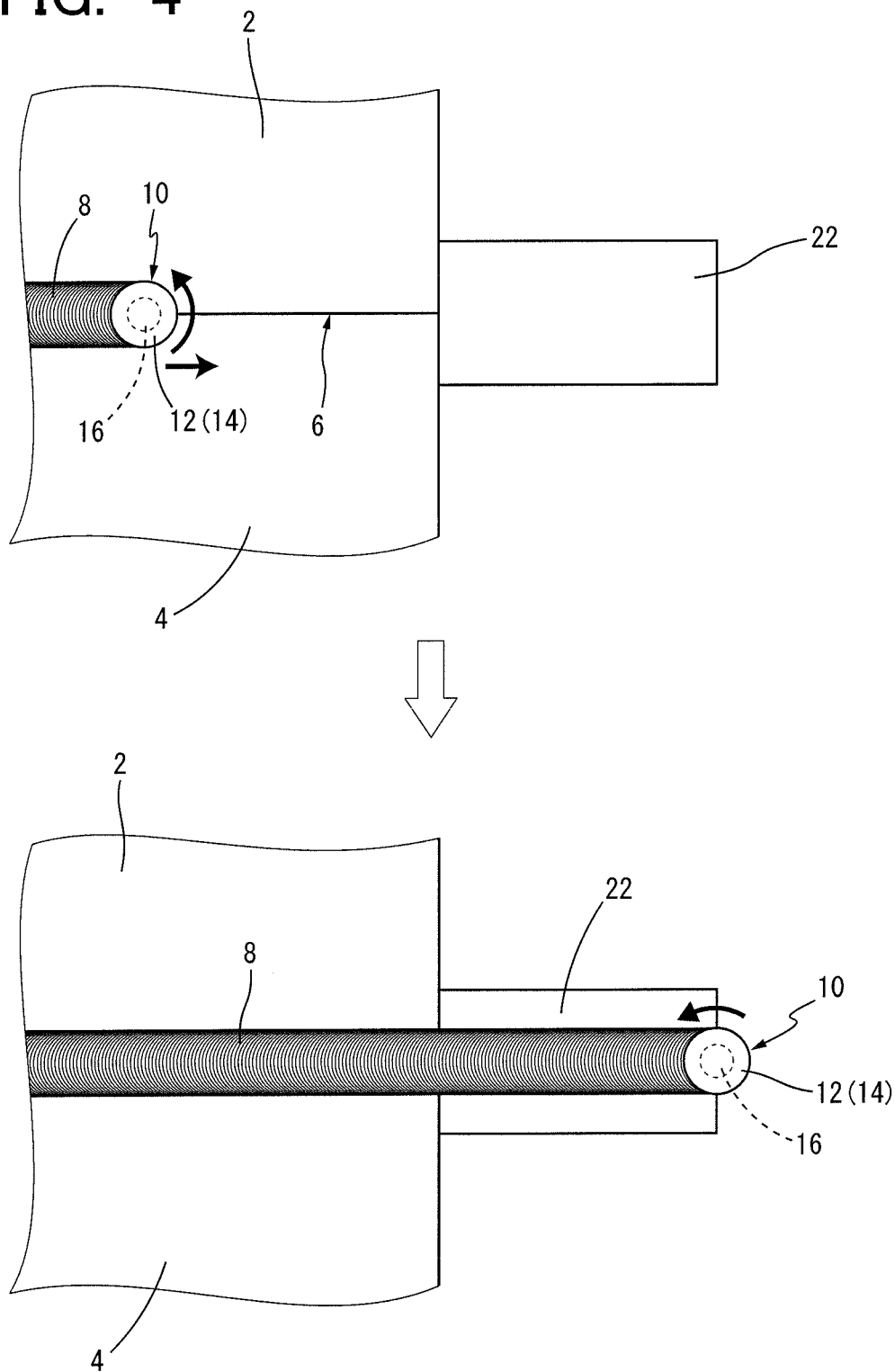
FIG. 4 is a schematic plan view showing a movement of the rotary tool used for the friction stir welding method on the side of termination of the welding operation shown in FIG. 3.

Namely, as shown in FIG. 4, after the abutting part 6 of the first and second members 2 and 4 has been friction-stir-welded by moving the rotary tool 10 relative to the first and second members 2 and 4 along the abutting part 6, while the pressure is applied to the abutting part 6 by the upper and lower shoulder members 12 and 14, the rotary tool 10 is inserted into the termination tab member 22 from the welding-terminal edge of the abutting part 6, and successively moved through the termination tab member 22, while the rotary tool 10 is rotated so as to friction-stir the metal of the termination tab member 22, whereby the metals firmly stuck to the circumferential surface of the probe 16 or the other parts of the rotary tool 10 during the friction stir welding operation performed with respect to the abutting part 6 of the first and second members 2 and 4 are effectively removed by the stirring of the metal of the termination tab member 22 while the rotary tool 10 is moved through the termination tab member 22. As a result, when the rotary tool 10 is removed out of the termination tab member 22, almost no metal adheres to the rotary tool 10. Accordingly, there is no need to perform a cumbersome operation for removing the metals from the rotary tool 10, and the rotary tool 10 can be repeatedly used for a subsequent friction stir welding operation, without being subjected to any operation after its use.

Although the dimensions of the termination tab member 22 are adequately determined such that the purpose of its use can be achieved, the dimensions of the termination tab member 22 are generally set so as to be similar to those of the initiation tab member 20 described above. Namely, the length (Le) of the termination tab member 22 in the welding direction shown in FIG. 3 is set so as to be not shorter than four times the diameter (D) of the shoulder members 12 and 14 of the rotary tool 10, and the width (We) of the termination tab member 22 in the direction perpendicular to the welding direction is set so as to be not shorter than twice the diameter (D) of the shoulder members 12 and 14. Further, the thickness (Te) of the termination tab member 22 is set so as to be not larger than a half of the diameter (d) of the probe 16 of the rotary tool 10. By using the termination tab member 22 having the dimensions described above, the metals of the first and second members 2 and 4 adhering to the rotary tool 10 are effectively removed.

Figure 5A:
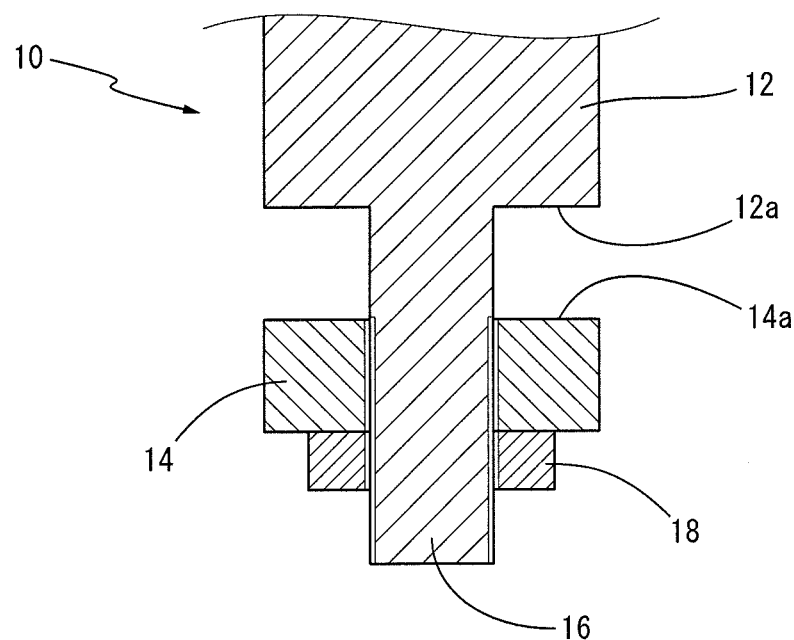
FIG. 5A is a schematic axial cross sectional view of an example of a bobbin tool.
Figure 5B:
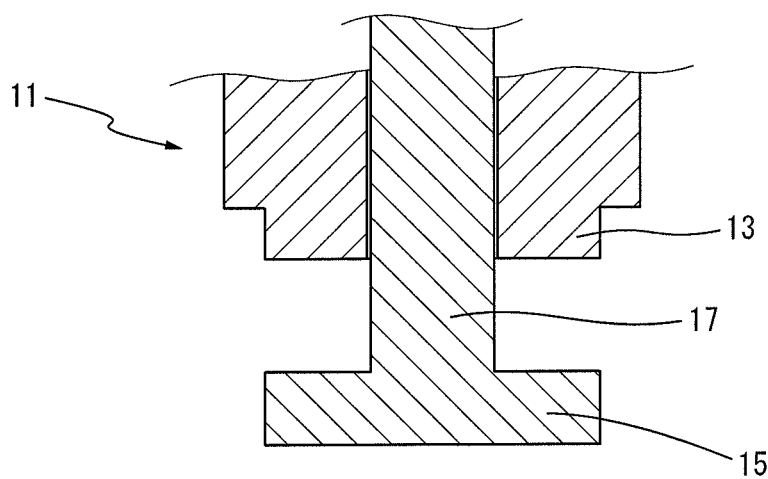
FIG. 5B is a schematic axial cross sectional view of an example of a self-reacting tool.

By the way, as the rotary tool 10 used for the friction stir welding operation described above, it is possible to adequately use various kinds of known rotary tool configured to perform the friction stir welding operation by its rotary motion while applying a pressure to the abutting part 6 (joining portions) of the first and second members 2 and 4 through the two shoulder members 12 and 14 which are provided on the probe in the form of a rod so as to be spaced apart from each other by a predetermined distance. For instance, it is possible to use a so-called bobbin tool 10 having a structure in which the upper shoulder member 12 and the lower shoulder member 14 are coaxially and fixedly connected with each other through the probe 16, such that the upper and lower shoulder members 12 and 14 are opposed to each other and spaced apart from each other by the predetermined distance, as shown in FIG. 5A. In the bobbin tool 10, the lower shoulder member 14 is screwed on the probe 16, whereby the length of the probe 16 is defined. Further, the lower shoulder member 14 is fixed in position by a locking nut 18 screwed on the probe 16 to prevent displacement of the lower shoulder member 14. Alternatively, it is also possible to use a so-called self-reacting tool 11 having a structure in which a probe 17 is coaxially fixed to a lower shoulder member 15 of two shoulder members, as shown in FIG. 5B, and the probe 17 is configured so as to be movable in its axial direction with respect to the upper shoulder member 13, so that the distance between the upper and lower shoulder members 13 and 15 can be changed.

The distance (length of the probe 16, 17) between the two shoulder members 12 and 14, and 13 and 15 is set so as to be smaller by a suitable amount than the thickness of the abutting part 6 (initiation tab member 20), so that an adequate pressing action can be applied to the abutting part 6 in which the two members 2 and 4 are joined together. Further, the self-reacting tool 11 may be configured such that its upper and lower shoulder members 13 and 15 are rotated in the same direction, or in respective different directions. The friction stir welding operation performed by using the rotary tool 10 according to the invention, such as the above-described bobbin tool 10 and self-reacting tool 11, is advantageously employed in the case where the thickness of the joining portions, for example, the thickness (t) of the first and second members 2 and 4 is not smaller than 2 mm. In the present invention, the upper limit of the thickness (t) of the first and second members 2 and 4 is generally set at about 10 mm.

Figure 6:
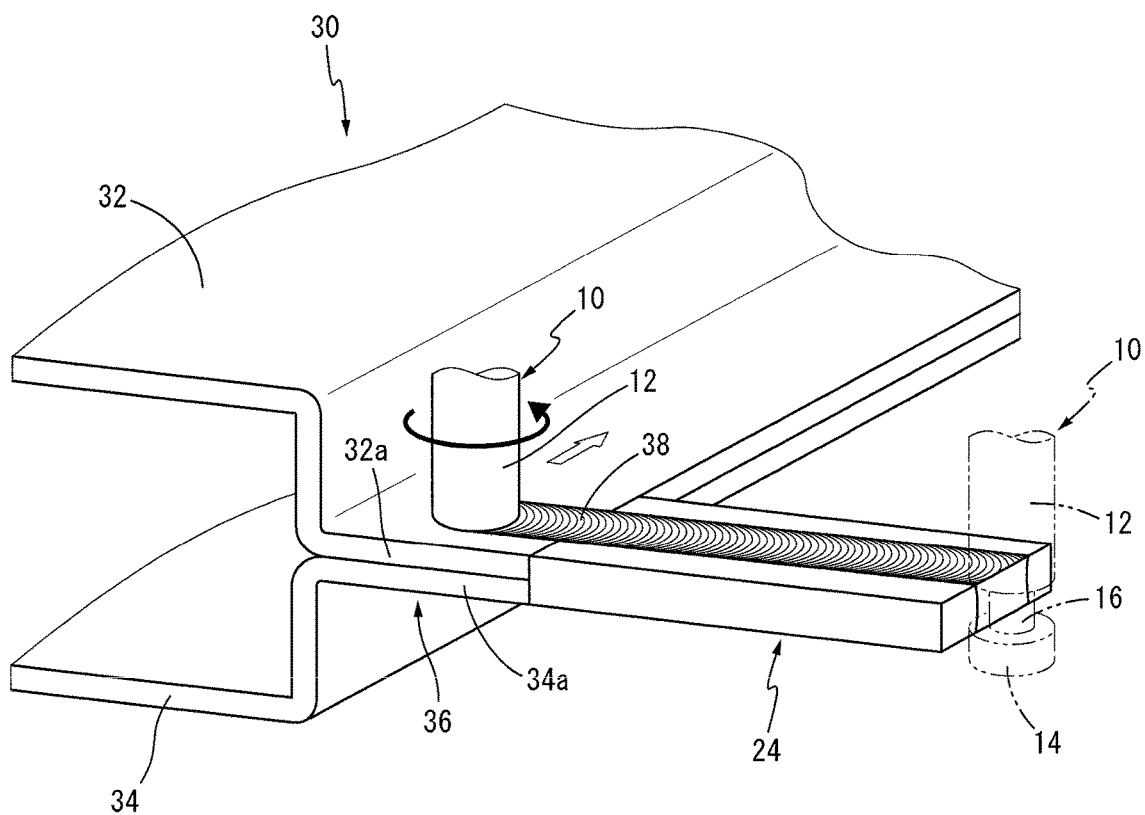
FIG. 6 is a schematic perspective view showing another example of the friction stir welding method according to the invention.

In the above-described embodiment, the friction stir welding operation is performed with respect to the abutting part 6 of the first and second members 2 and 4, to join together those members 2 and 4 along a line. However, the present invention is also applicable to a method of performing the friction stir welding operation with respect to an overlapping part 36 in which a planar flange portion 32a of an upper member 32 (first member) having a hat-like cross sectional shape and a planar flange portion 34a of a lower member 34 (second member) having a hat-like cross sectional shape are superposed on each other, so that the upper and lower members 32 and 34 cooperate to form a hollow body 30, as shown in FIG. 6. In this embodiment, an initiation tab member 24 having a thickness similar to that of the overlapping part 36 is held in abutting contact with a side end face of the overlapping part 36 of the planar flange portions 32a and 34a, and the rotary tool 10 is moved through the initiation tab member 24 into the overlapping part 36, to perform the friction stir welding operation in the direction of extension of the overlapping part 36. Accordingly, the rotary tool 10 is moved and inserted from the initiation tab member 24 into the overlapping part 36, while rotated about its axis, and then the direction of movement of the rotary tool 10 is changed by 90°, and the friction stir welding operation is performed by moving the rotary tool 10 relative to the overlapping part 36 in the direction of its extension. At this time, the friction stir welding operation is performed with respect to the overlapping part 36 by moving the rotary tool 10 through the initiation tab member 24 according to the invention, whereby a sound friction-stir-welded area 38 is advantageously formed as in the case of the above-described embodiment.

In the embodiment shown in FIG. 6, the initiation tab member 24 is disposed in abutting contact with the widthwise end face of the overlapping part 36 of the flange portions 32a and 34a. However, it is also possible to dispose the initiation tab member (24) in abutting contact with a longitudinal end face of the overlapping part 36, and linearly perform the friction stir welding operation by the rotary tool 10 with respect to the overlapping part 36 in the direction of its extension, through the initiation tab member 24. In this case too, substantially the same effects as achieved in the above-described embodiments can be achieved.

By performing the friction stir welding operation as described above, it is possible to obtain a product having the sound friction-stir-welded area 8, 38. In this respect, it is noted that the initiation tab member 20 adheres to the thus obtained product through the friction-stirred metals, on the side of initiation of the welding operation. In some cases, the termination tab member 22 also adheres to the product on the side of termination of the welding operation. However, the initiation tab member 20 and the termination tab member 22 can be easily mechanically broken off from the product, so that the product having the sound welded area 8 can be easily obtained. In the present invention, it is also advantageous to cut and remove the metals adhering to the end faces of the first and second members 2 and 4 by using a machining device such as a grinder to finish those end faces, as necessary, after removing the tab members 20 and 22 as described above.

The product obtained by the friction stir welding method described above is free from joint defects, so that the present invention can be advantageously applied to a technique of producing a large member by joining together wrought products in the form of sheet members, extruded members, or the like, and cast members. Further, the thus obtained product can be advantageously used as a structural member of a railway car and a structural member of an automobile, such as a subframe, for example, which exhibit required properties.

EXAMPLES

To clarify the invention more specifically, examples of the invention will be described. However, it goes without saying that the invention is by no means limited to the details of the illustrated examples. Further, it is to be understood that the invention may be embodied with various changes, modifications and improvements, which are not illustrated herein and which may occur to those skilled in the art, without departing from the spirit of the invention.

Example 1

A planar first member (2) and a planar second member (4) each of which is formed of one of various aluminum materials indicated in Tables 1 and 2 given below, and has a thickness (t) of 2.8-9.2 mm, a width of 300 mm and a length of 5000 mm were butted on each other at their side faces which are opposed to each other in the direction of their width, to provide an abutting part (6). The first and second members (2, 4) were fixed on a table having a gap provided so as to be located below the abutting part (6) of the two members (2, 4). A planar initiation tab member (20) which is formed of one of various aluminum materials indicated in Tables 1 and 2 and has a thickness (Ts), a length (Ls) in a welding direction and a width (Ws) in a direction perpendicular to the welding direction, as indicated in Tables 1 and 2, was held in abutting contact with an end portion of the abutting part (6) of the two members (2, 4) on the side of initiation of a welding operation, as shown in FIG. 1, and fixed on the table, like the above-described two members (2, 4).

On the other hand, a bobbin tool having two shoulder members (12, 14) and a probe (16) as shown in FIG. 5A was used as the rotary tool (10). The diameter (D) of the two shoulder members (12, 14), the length of the probe (16) between two shoulder surfaces (12a, 14a) and the diameter (d) of the probe (16) are indicated in Tables 1 and 2. A friction stir welding operation was performed with respect to the abutting part (6) under conditions of a rotational speed and a welding speed indicated in Tables 1 and 2, by pressing an end portion of the initiation tab member (20) between the two shoulder surfaces (12a, 14a) of the bobbin tool (10), moving the bobbin tool (10) toward the abutting part (6) so that the bobbin tool (10) passes through the initiation tab member (20) in its longitudinal direction, while the initiation tab member (20) is friction-stirred, then moving and inserting the bobbin tool (10) into the abutting part (6) of the two members (2, 4), and further moving the bobbin tool (10) in the direction of extension of the abutting part (6).

The thus obtained various friction-stir-welded products formed of respective combinations of various aluminum materials of the first and second members (2, 4) and the initiation tab member (20) were examined in terms of their joint strength by a tensile shearing test. Specifically, the materials which suffered from fracture and positions of the fracture were examined, and joint efficiency was obtained based on the material having a lower degree of fracture strength. Results of the examination are indicated in Tables 1 and 2.

TABLE 1

| | | FSW Example | | | | |
|---|---|---|---|---|---|---|
| | | 1 | 2 | 3 | 4 | 5 |
| First member (2) | JIS material | 7075 | 7050 | 5182 | 5052 | 4343 |
| | Temper | T76 | T7451 | O | O | O |
| | Thickness: t (mm) | 3.2 | 6.6 | 6.2 | 4.9 | 8.0 |

TABLE 1-continued

| | | | | | | |
|---|---|---|---|---|---|---|
| Second member (4) | JIS material | 7075 | 5052 | 5182 | 6063 | 6061 |
| | Temper | T76 | O | O | T6 | T6 |
| | Thickness: t (mm) | 3.2 | 6.6 | 6.2 | 4.9 | 8.0 |
| Initiation tab member (20) | JIS material | 1200 | 3003 | 1100 | 3004 | 6063 |
| | Thickness: Ts (mm) | 3.2 | 6.6 | 6.2 | 4.9 | 8.0 |
| | Length: Ls (mm) | 80 | 75.9 | 96.6 | 65.4 | 101.8 |
| | Width: Ws (mm) | 40 | 46.4 | 49.9 | 32.8 | 53.4 |
| Rotary tool (10) | Diameter: D (mm) of shoulder members | 15 | 18.9 | 22.9 | 16.3 | 24.6 |
| | Length (mm) of probe | 3 | 6.1 | 6.1 | 4.7 | 7.6 |
| | Diameter: d (mm) of probe | 8 | 14.2 | 17.0 | 11.2 | 16.9 |
| Welding conditions | Rotational speed (rpm) | 1000 | 1500 | 1200 | 1100 | 900 |
| | Welding speed (mm/min.) | 500 | 1000 | 600 | 800 | 500 |
| Results of welding | Fractured material | 7075 | 5052 | 5182 | 5052 | 4343 |
| | Fractured position | HAZ✕ | Base material | Base material | Base material | Base material |
| | Joint efficiency (%) | 85 | 100 | 100 | 100 | 75 |

| | | FSW Example | | | | |
|---|---|---|---|---|---|---|
| | | 6 | 7 | 8 | 9 | 10 |
| First member (2) | JIS material | 4004 | 2024 | 2219 | ADC3 | ADC12 |
| | Temper | O | T3 | T6 | T6 | O |
| | Thickness: t (mm) | 3.2 | 2.8 | 3.7 | 6.8 | 3.6 |
| Second member (4) | JIS material | 2014 | 2024 | 7003 | ADC3 | 6N01 |
| | Temper | T4 | T3 | T5 | T6 | T4 |
| | Thickness: t (mm) | 3.2 | 2.8 | 3.7 | 6.8 | 3.6 |
| Initiation tab member (20) | JIS material | 6061 | 6N01 | 6063 | 3004 | 8090 |
| | Thickness: Ts (mm) | 3.2 | 2.8 | 3.7 | 6.8 | 3.6 |
| | Length: Ls (mm) | 52.4 | 58.6 | 70.5 | 95.5 | 83.2 |
| | Width: Ws (mm) | 30.8 | 33.6 | 40.1 | 48.3 | 39.0 |
| Rotary tool (10) | Diameter: D (mm) of shoulder members | 11.3 | 12.9 | 17.3 | 21.4 | 19.4 |
| | Length (mm) of probe | 3.2 | 2.6 | 3.5 | 6.4 | 3.6 |
| | Diameter: d (mm) of probe | 6.7 | 8.6 | 9.3 | 17.0 | 10.4 |
| Welding conditions | Rotational speed (rpm) | 900 | 800 | 800 | 1000 | 900 |
| | Welding speed (mm/min.) | 500 | 300 | 400 | 500 | 500 |
| Results of welding | Fractured material | 4004 | 2024 | 7003 | ADC3 | ADC12 |
| | Fractured position | Base material | HAZ✕ | HAZ✕ | HAZ✕ | Base material |
| | Joint efficiency (%) | 80 | 85 | 80 | 75 | 100 |

✕HAZ: heat affected zone

TABLE 2

| | | FSW Example | | | | |
|---|---|---|---|---|---|---|
| | | 11 | 12 | 13 | 14 | 15 |
| First member (2) | JIS material | AC4C | 7075 | 7075 | 7050 | 5182 |
| | Temper | T6 | T76 | T76 | T7451 | O |
| | Thickness: t (mm) | 8.9 | 3.2 | 3.2 | 9.2 | 7.8 |
| Second member (4) | JIS material | 7N01 | 7075 | 7075 | 5052 | 5182 |
| | Temper | T6 | T76 | T76 | H34 | O |
| | Thickness: t (mm) | 8.9 | 3.2 | 3.2 | 9.2 | 7.8 |
| Initiation tab member (20) | JIS material | 3003 | — | 7075 | 7050 | 5182 |
| | Thickness: Ts (mm) | 8.9 | — | 3.9 | 9.2 | 7.8 |
| | Length: Ls (mm) | 105.2 | — | 80 | 132.4 | 98.3 |
| | Width: Ws (mm) | 52.3 | — | 40 | 68.2 | 51.0 |
| Rotary tool (10) | Diameter: D (mm) of shoulder members | 25.6 | 15 | 15 | 30.9 | 24.5 |
| | Length (mm) of probe | 8.4 | 3 | 3 | 9.0 | 7.6 |
| | Diameter: d (mm) of probe | 20.6 | 8 | 8 | 23.2 | 19.0 |
| Welding conditions | Rotational speed (rpm) | 800 | 1000 | 1000 | 1500 | 1200 |
| | Welding speed (mm/min.) | 400 | 500 | 500 | 1000 | 600 |
| Results of welding | Fractured material | AC4C | 7075 | 7075 | 5052 | 5182 |
| | Position of fracture | HAZ✕ | Welded area | Welded area | Welded area | Welded area |
| | Joint efficiency (%) | 80 | 10 | 20 | 30 | 20 |

| | | FSW Example | | | | |
|---|---|---|---|---|---|---|
| | | 16 | 17 | 18 | 19 | 20 |
| First member (2) | JIS material | 5052 | 4343 | 4004 | 2024 | ADC3 |
| | Temper | O | O | O | T3 | T6 |
| | Thickness: t (mm) | 3.5 | 9.0 | 5.7 | 8.5 | 2.8 |
| Second member (4) | JIS material | 6063 | 6061 | 2014 | 2024 | ADC3 |
| | Temper | T6 | T6 | T4 | T3 | T6 |
| | Thickness: t (mm) | 3.5 | 9.0 | 5.7 | 8.5 | 2.8 |
| Initiation tab member (20) | JIS material | 2014 | ADC12 | AC4C | 2024 | ADC3 |
| | Thickness: Ts (mm) | 3.5 | 9.0 | 5.7 | 8.5 | 2.8 |
| | Length: Ls (mm) | 73.4 | 113.1 | 92.5 | 98.4 | 69.8 |
| | Width: Ws (mm) | 37.8 | 61.5 | 48.9 | 52.0 | 36.5 |
| Rotary tool (10) | Diameter: D (mm) of shoulder members | 17.3 | 26.9 | 20.7 | 24.2 | 16.3 |
| | Length (mm) of probe | 3.2 | 9.0 | 5.6 | 8.5 | 2.5 |
| | Diameter: d (mm) of probe | 9.0 | 20.4 | 13.7 | 17.0 | 9.9 |
| Welding conditions | Rotational speed (rpm) | 1100 | 900 | 900 | 800 | 1000 |
| | Welding speed (mm/min.) | 800 | 500 | 500 | 300 | 500 |

TABLE 2-continued

| Results of welding | Fractured material | 5052 | 4343 | 4004 | 2024 | ADC3 |
|---|---|---|---|---|---|---|
| | Position of fracture | Welded area | Welded area | Welded area | Welded area | Welded area |
| | Joint efficiency (%) | 40 | 30 | 30 | 20 | 15 |

※HAZ: heat affected zone

As is apparent from the results in Tables 1 and 2, where the friction stir welding operation was performed by using the bobbin tool (10) with respect to the abutting part (6) of the first and second members (2, 4) which are formed of the same material or respective different materials selected from a group consisting of a cast aluminum alloy and 2000 series, 4000 series, 5000 series and 7000 series aluminum alloys, it was recognized that sound welded areas which have no joint defects and suffer from reduced generation of burr can be obtained by disposing the initiation tab member (20) in the form of the planar member formed of a 1000 series aluminum alloy, a 3000 series aluminum alloy, a 6000 series aluminum alloy or an 8000 aluminum alloy, in abutting contact with the abutting part (6) of the two members (2, 4), and inserting the probe (16) of the bobbin tool (10) through the initiation tab member (20) into the abutting part (6), as in the FSW Examples 1-11.

On the other hand, it was revealed that in the case where the initiation tab member (20) was not used and in the case where the initiation tab member (20) was formed of the same aluminum material as the two members (2, 4), as in the FSW Examples 12-20, sound welded areas cannot be formed due to occurrence of problems such as a failure of joining of the two members (2, 4) by the friction stir welding operation, generation of defective parts such as a void and a fractured part in the welded area, and considerable generation of burr.

Example 2

A first member (2) and a second member (4) each of which is a rolled sheet formed of an aluminum material: 5454-O, and has a thickness (t) of 4.0 mm, a width of 300 mm and a length of 5000 mm were butted on each other in the direction of their width, to provide an abutting part (6). The first and second members (2, 4) were fixed on a table having a gap provided so as to be located below the abutting part (6) of the two members (2, 4). An initiation tab member (20) which is formed of an aluminum material: 1200 and has a thickness (Ts) of 4.0 mm, a length (Ls) in a welding direction and a width (Ws) in a direction perpendicular to the welding direction, as indicated in Table 3 given below, was abutted on an end portion of the abutting part (6) of the two members (2, 4) on the side of initiation of the welding operation, and fixed on the table, like the two members (2, 4).

A friction stir welding operation was performed as in the Example 1, by using, as a rotary tool, a bobbin tool (10) having dimensions similar to those of the bobbin tool (10) used in the Example 1, except that the probe (16) of the bobbin tool (10) used in this Example has a length of 3.7 mm in its axial direction between the upper and lower shoulder surfaces (12a, 14a). Results of the welding operation are indicated in Table 3.

TABLE 3

| | | FSW Example | | | | | | | |
|---|---|---|---|---|---|---|---|---|---|
| | | 21 | 22 | 23 | 24 | 25 | 26 | 27 | 28 |
| First member (2) | JIS material | 5454 | 5454 | 5454 | 5454 | 5454 | 5454 | 5454 | 5454 |
| | Temper | O | O | O | O | O | O | O | O |
| | Thickness: t (mm) | 4 | 4 | 4 | 4 | 4 | 4 | 4 | 4 |
| Second member (4) | JIS material | 5454 | 5454 | 5454 | 5454 | 5454 | 5454 | 5454 | 5454 |
| | Temper | O | O | O | O | O | O | O | O |
| | Thickness: t (mm) | 4 | 4 | 4 | 4 | 4 | 4 | 4 | 4 |
| Initiation tab member (20) | JIS material | 1200 | 1200 | 1200 | 1200 | 1200 | 1200 | 1200 | 1200 |
| | Thickness: Ts (mm) | 4 | 4 | 4 | 4 | 4 | 4 | 4 | 4 |
| | Length: Ls (mm) | 60 | 70 | 80 | 80 | 60 | 70 | 55 | 80 |
| | Width: Ws (mm) | 40 | 40 | 30 | 35 | 30 | 40 | 40 | 25 |
| Rotary tool (10) | Diameter: D (mm) of shoulder members | 15 | 15 | 15 | 15 | 15 | 15 | 15 | 15 |
| | Length (mm) of probe | 3.7 | 3.7 | 3.7 | 3.7 | 3.7 | 3.7 | 3.7 | 3.7 |
| | Diameter: d (mm) of probe | 8 | 8 | 8 | 8 | 8 | 8 | 8 | 8 |
| Welding conditions | Rotational speed (rpm) | 2000 | 2000 | 2000 | 2000 | 2000 | 2000 | 2000 | 2000 |
| | Welding speed (mm/min.) | 1000 | 1000 | 1000 | 1000 | 1000 | 1000 | 1000 | 1000 |

TABLE 3-continued

|  |  | FSW Example | | | | | | | |
|---|---|---|---|---|---|---|---|---|---|
|  |  | 21 | 22 | 23 | 24 | 25 | 26 | 27 | 28 |
| Results of welding | Fractured material | 5454 | 5454 | 5454 | 5454 | 5454 | 5454 | 5454 | 5454 |
|  | Position of fracture | Base material | Base material | Base material | Base material | Base material | Base material | Welded area | Welded area |
|  | Joint efficiency (%) | 100 | 100 | 100 | 100 | 100 | 100 | 80 | 75 |

As is apparent from the results in Table 3, soundness of the friction-stir-welded area (8) can be advantageously improved by setting the length (Ls) of the initiation tab member (20) in the welding direction so as to be not shorter than four times the diameter (D) of the shoulder members (12, 14) of the bobbin tool (10), and setting the width (Ws) of the initiation tab member (20) in the direction perpendicular to the welding direction so as to be not shorter than twice the diameter (D) of the shoulder members (12, 14).

Example 3

A planar termination tab member (22) which is formed of one of various aluminum materials indicated in Tables 4 and 5 given below, and which has a length (Le) in the welding direction, a width (We) in a direction perpendicular to the welding direction and a thickness (Te), as indicated in Tables 4 and 5, was held in abutting contact with end faces of the two planar members (2, 4) in the abutting part (6) on the side of termination of the welding operation. The friction stir welding operation was started as in the FSW Examples 1-20 of the Example 1, and terminated by moving the bobbin tool (10) that had been moved across the abutting part (6) in the longitudinal direction thereof, into the termination tab member (22) from the terminal end of the abutting part (6), and moving the bobbin tool (10) through the termination tab member (22) in the welding direction, as shown in FIG. 4. When the friction stir welding operation was terminated as described above, the bobbin tool (10) was observed to examine a degree of adhesion of metals to the bobbin tool (10). Further, the friction stir welding operation was performed again as described above, by using the bobbin tool (10) that had been used once for the friction stir welding operation, without subjecting the bobbin tool (10) to any other treatment after its use. Percentages of success of the second friction stir welding operation are shown in Table 3. The friction stir welding operation was evaluated in terms of the degree of adhesion of the metals to the bobbin tool (10), as "Good" where almost no metal adhered to the bobbin tool (10), "Average" where adhesion of the metals to the bobbin tool (10) was recognized, and "Poor" where considerable adhesion of the metals to the bobbin tool (10) was recognized.

TABLE 4

|  |  | FSW Example | | | | |
|---|---|---|---|---|---|---|
|  |  | 31 | 32 | 33 | 34 | 35 |
| First member (2) | JIS material | 7075 | 7050 | 5182 | 5052 | 4343 |
|  | Temper | T76 | T7451 | O | O | O |
|  | Thickness: t (mm) | 3.2 | 6.6 | 6.2 | 4.9 | 8.0 |
| Second member (4) | JIS material | 7075 | 5052 | 5182 | 6063 | 6061 |
|  | Temper | T76 | O | O | T6 | T6 |
|  | Thickness: t (mm) | 3.2 | 6.6 | 6.2 | 4.9 | 8.0 |
| Initiation tab member (20) | JIS material | 1200 | 3003 | 1100 | 3004 | 6063 |
|  | Thickness: Ts (mm) | 3.2 | 6.6 | 6.2 | 4.9 | 8.0 |
|  | Length: Ls (mm) | 80 | 75.9 | 96.6 | 65.4 | 101.8 |
|  | Width: Ws (mm) | 40 | 46.4 | 49.9 | 32.8 | 53.4 |
| Termination tab member (22) | JIS material | 8011 | 1200 | 3003 | 3105 | 6082 |
|  | Thickness: Te (mm) | 3.2 | 6.6 | 6.2 | 4.9 | 8.0 |
|  | Length: Le (mm) | 80 | 63.9 | 71.0 | 50.5 | 75.3 |
|  | Width: We (mm) | 40 | 32.6 | 40.4 | 22.7 | 39.7 |
| Rotary tool (10) | Diameter: D (mm) of shoulder members | 15 | 18.9 | 22.9 | 16.3 | 24.6 |
|  | Length (mm) of probe | 3 | 6.1 | 6.1 | 4.7 | 7.6 |
|  | Diameter: d (mm) of probe | 8 | 14.2 | 17.0 | 11.2 | 16.9 |
| Welding conditions | Rotational speed (rpm) | 1000 | 1500 | 1200 | 1100 | 900 |
|  | Welding speed (mm/min.) | 500 | 1000 | 600 | 800 | 500 |
| Adhesion of metals | | Good | Good | Good | Good | Good |
| Percentage (%) of success of the second FSW | | 100 | 100 | 100 | 100 | 100 |

|  |  | FSW Example | | | | |
|---|---|---|---|---|---|---|
|  |  | 36 | 37 | 38 | 39 | 40 |
| First member (2) | JIS material | 4004 | 2024 | 2219 | ADC3 | ADC12 |
|  | Temper | O | T3 | T6 | T6 | O |
|  | Thickness: t (mm) | 3.2 | 2.8 | 3.7 | 6.8 | 3.6 |
| Second member (4) | JIS material | 2014 | 2024 | 7003 | ADC3 | 6N01 |
|  | Temper | T4 | T3 | T5 | T6 | T4 |
|  | Thickness: t (mm) | 3.2 | 2.8 | 3.7 | 6.8 | 3.6 |
| Initiation tab member (20) | JIS material | 6061 | 6N01 | 6063 | 3004 | 8090 |
|  | Thickness: Ts (mm) | 3.2 | 2.8 | 3.7 | 6.8 | 3.6 |
|  | Length: Ls (mm) | 52.4 | 58.6 | 70.5 | 95.5 | 83.2 |
|  | Width: Ws (mm) | 30.8 | 33.6 | 40.1 | 48.3 | 39.0 |
| Termination tab member (22) | JIS material | 6101 | 6061 | 6063 | 3004 | 6N01 |
|  | Thickness: Te (mm) | 3.2 | 2.8 | 3.7 | 6.8 | 3.6 |
|  | Length: Le (mm) | 32.9 | 35.3 | 44.6 | 76.4 | 45.1 |
|  | Width: We (mm) | 14.6 | 21.7 | 18.7 | 34.7 | 26.8 |

TABLE 4-continued

| Rotary tool (10) | Diameter: D (mm) of shoulder members | 11.3 | 12.9 | 17.3 | 21.4 | 19.4 |
|---|---|---|---|---|---|---|
| | Length (mm) of probe | 3.2 | 2.6 | 3.5 | 6.4 | 3.6 |
| | Diameter: d (mm) of probe | 6.7 | 8.6 | 9.3 | 17.0 | 10.4 |
| Welding conditions | Rotational speed (rpm) | 900 | 800 | 800 | 1000 | 900 |
| | Welding speed (mm/min.) | 500 | 300 | 400 | 500 | 500 |
| Adhesion of metals | | Good | Good | Good | Good | Good |
| Percentage (%) of success of the second FSW | | 100 | 100 | 100 | 100 | 100 |

TABLE 5

| | | FSW Example | | | | |
|---|---|---|---|---|---|---|
| | | 41 | 42 | 43 | 44 | 45 |
| First member (2) | JIS material | AC4C | 7075 | 7075 | 7050 | 5182 |
| | Temper | T6 | T76 | T76 | T7451 | O |
| | Thickness: t (mm) | 8.9 | 3.2 | 3.2 | 9.2 | 7.8 |
| Second member (4) | JIS material | 7N01 | 7075 | 7075 | 5052 | 5182 |
| | Temper | T6 | T76 | T76 | H34 | O |
| | Thickness: t (mm) | 8.9 | 3.2 | 3.2 | 9.2 | 7.8 |
| Initiation tab member (20) | JIS material | 3003 | 1200 | 1200 | 3003 | 1100 |
| | Thickness: Ts (mm) | 8.9 | 3.2 | 3.2 | 9.2 | 7.8 |
| | Length: Ls (mm) | 105.2 | 80 | 80 | 132.4 | 98.3 |
| | Width: Ws (mm) | 52.3 | 40 | 40 | 68.2 | 51.0 |
| Termination tab member (22) | JIS material | 1100 | — | 7075 | 5182 | 5182 |
| | Thickness: Te (mm) | 8.9 | — | 3.2 | 9.2 | 7.8 |
| | Length: Le (mm) | 87.2 | — | 80 | 96.5 | 82.1 |
| | Width: We (mm) | 47.4 | — | 40 | 52.0 | 42.8 |
| Rotary tool (10) | Diameter: D (mm) of shoulder members | 25.6 | 15 | 15 | 30.9 | 24.5 |
| | Length (mm) of probe | 8.4 | 3 | 3 | 9.0 | 7.6 |
| | Diameter: d (mm) of probe | 20.6 | 8 | 8 | 23.2 | 19.0 |
| Welding conditions | Rotational speed (rpm) | 800 | 1000 | 1000 | 1500 | 1200 |
| | Welding speed (mm/min.) | 400 | 500 | 500 | 1000 | 600 |
| Adhesion of metals | | Good | Poor | Average | Average | Poor |
| Percentage (%) of success of the second FSW | | 100 | 10 | 20 | 60 | 70 |

| | | FSW Example | | | | |
|---|---|---|---|---|---|---|
| | | 46 | 47 | 48 | 49 | 50 |
| First member (2) | JIS material | 5052 | 4343 | 4004 | 2024 | ADC3 |
| | Temper | O | O | O | T3 | T6 |
| | Thickness: t (mm) | 3.5 | 9.0 | 5.7 | 8.5 | 2.8 |
| Second member (4) | JIS material | 6063 | 6061 | 2014 | 2024 | ADC3 |
| | Temper | T6 | T6 | T4 | T3 | T6 |
| | Thickness: t (mm) | 3.5 | 9.0 | 5.7 | 8.5 | 2.8 |
| Initiation tab member (20) | JIS material | 3004 | 6063 | 6061 | 6N01 | 3004 |
| | Thickness: Ts (mm) | 3.5 | 9.0 | 5.7 | 8.5 | 2.8 |
| | Length: Ls (mm) | 73.4 | 113.1 | 92.5 | 98.4 | 69.8 |
| | Width: Ws (mm) | 37.8 | 61.5 | 48.9 | 52.0 | 36.5 |
| Termination tab member (22) | JIS material | ADC3 | AC4C | 7075 | 2024 | 2014 |
| | Thickness: Te (mm) | 3.5 | 9.0 | 5.7 | 8.5 | 2.8 |
| | Length: Le (mm) | 44.1 | 82.6 | 60.7 | 75.9 | 46.6 |
| | Width: We (mm) | 18.8 | 43.7 | 35.5 | 43.1 | 26.5 |
| Rotary tool (10) | Diameter: D (mm) of shoulder members | 17.3 | 26.9 | 20.7 | 24.2 | 16.3 |
| | Length (mm) of probe | 3.2 | 9.0 | 5.6 | 8.5 | 2.5 |
| | Diameter: d (mm) of probe | 9.0 | 20.4 | 13.7 | 17.0 | 9.9 |
| Welding conditions | Rotational speed (rpm) | 1100 | 900 | 900 | 800 | 1000 |
| | Welding speed (mm/min.) | 800 | 500 | 500 | 300 | 500 |
| Adhesion of metals | | Poor | Poor | Poor | Poor | Poor |
| Percentage (%) of success of the second FSW | | 30 | 40 | 20 | 30 | 40 |

As is apparent from the results in Tables 4 and 5, sticking of the metals to the bobbin tool (10) can be effectively reduced or prevented by using one of the 1000 series, 3000 series, 6000 series and 8000 series aluminum alloys, as the material of the termination tab member (22), as in the FSW Examples 31-41, whereby the bobbin tool (10) that has been used for the friction stir welding operation can be successively used to perform the friction stir welding operation with respect to another set of two members (2, 4).

Example 4

The friction stir welding operation was performed as in the FSW Example 31 of the above-described Example 3, except that the thickness (t) of the first and second members (2, 4), the thickness (Ts) of the initiation tab member (20), the length (Le) of the termination tab member (22) in the welding direction, and the width (We) of the termination tab member (22) in the direction perpendicular to the welding direction were set as indicated in Table 6 given below. The friction stir welding operation was terminated after moving the bobbin tool (10) through the termination tab member (22). After the friction stir welding operation was terminated, the bobbin tool (10) was observed and evaluated in terms of the degree of adhesion of metals to the bobbin tool (10), as in the Example 3. Results of the evaluation are indicated in Table 6.

TABLE 6

|  |  | FSW Example | | | | |
| --- | --- | --- | --- | --- | --- | --- |
|  |  | 51 | 52 | 53 | 54 | 55 |
| First member (2) | JIS material | 7075 | 7075 | 7075 | 7075 | 7075 |
|  | Temper | T76 | T76 | T76 | T76 | T76 |
|  | Thickness: t (mm) | 3.2 | 6.6 | 6.2 | 4.9 | 8.0 |
| Second member (4) | JIS material | 7075 | 7075 | 7075 | 7075 | 7075 |
|  | Temper | T76 | T76 | T76 | T76 | T76 |
|  | Thickness: t (mm) | 3.2 | 6.6 | 6.2 | 4.9 | 8.0 |
| Initiation tab member (20) | JIS material | 1200 | 1200 | 1200 | 1200 | 1200 |
|  | Thickness: Ts (mm) | 3.2 | 3.2 | 3.2 | 3.2 | 3.2 |
|  | Length: Ls (mm) | 80 | 80 | 80 | 80 | 80 |
|  | Width: Ws (mm) | 40 | 40 | 40 | 40 | 40 |
| Termination tab member (22) | JIS material | 6061 | 6061 | 6061 | 6061 | 6061 |
|  | Thickness: Te (mm) | 3.2 | 3.2 | 3.2 | 3.2 | 3.2 |
|  | Length: Le (mm) | 60 | 70 | 80 | 80 | 60 |
|  | Width: We (mm) | 40 | 40 | 30 | 35 | 30 |
| Rotary tool (10) | Diameter: D (mm) of shoulder members | 15 | 15 | 15 | 15 | 15 |
|  | Length (mm) of probe | 3 | 3 | 3 | 3 | 3 |
|  | Diameter: d (mm) of probe | 8 | 8 | 8 | 8 | 8 |
| Welding conditions | Rotational speed (rpm) | 1000 | 1000 | 1000 | 1000 | 1000 |
|  | Welding speed (mm/min.) | 500 | 500 | 500 | 500 | 500 |
|  | Adhesion of metals | Good | Good | Good | Good | Good |
|  | Percentage (%) of success of the second FSW | 100 | 100 | 100 | 100 | 100 |

|  |  | FSW Example | | | | |
| --- | --- | --- | --- | --- | --- | --- |
|  |  | 56 | 57 | 58 | 59 | 60 |
| First member (2) | JIS material | 7075 | 7075 | 7075 | 7075 | 7075 |
|  | Temper | T76 | T76 | T76 | T76 | T76 |
|  | Thickness: t (mm) | 3.2 | 3.2 | 9.2 | 7.8 | 3.5 |
| Second member (4) | JIS material | 7075 | 7075 | 7075 | 7075 | 7075 |
|  | Temper | T76 | T76 | T76 | T76 | T76 |
|  | Thickness: t (mm) | 3.2 | 3.2 | 9.2 | 7.8 | 3.5 |
| Initiation tab member (20) | JIS material | 1200 | 1200 | 1200 | 1200 | 1200 |
|  | Thickness: Ts (mm) | 3.2 | 3.2 | 3.2 | 3.2 | 3.2 |
|  | Lengt: Ls (mm) | 80 | 80 | 80 | 80 | 80 |
|  | Width: Ws (mm) | 40 | 40 | 40 | 40 | 40 |
| Terminiation tab member (22) | JIS material | 6061 | 6061 | 6061 | 6061 | 6061 |
|  | Thickness: Te (mm) | 3.2 | 3.2 | 3.2 | 3.2 | 3.2 |
|  | Length: Le (mm) | 70 | 55 | 57 | 80 | 80 |
|  | Width: We (mm) | 40 | 40 | 40 | 28 | 26 |
| Rotary tool (10) | Diameter: D (mm) of shoulder members | 15 | 15 | 15 | 15 | 15 |
|  | Length (mm) of probe | 3 | 3 | 3 | 3 | 3 |
|  | Diameter: d (mm) of probe | 8 | 8 | 8 | 8 | 8 |
| Welding conditions | Rotational speed (rpm) | 1000 | 1000 | 1000 | 1000 | 1000 |
|  | Welding speed (mm/min.) | 500 | 500 | 500 | 500 | 500 |
|  | Adhesion of metals | Good | Average | Average | Average | Average |
|  | Percentage (%) of success of the second FSW | 100 | 60 | 80 | 83 | 76 |

As is apparent from the results in Table 6, it is recognized that sticking of the metals to the bobbin tool (10) can be effectively reduced or prevented by setting the length (Le) of the termination tab member (22) in the welding direction so as to be not shorter than four times the diameter (D) of the shoulder members (12, 14) of the bobbin tool (10), and setting the width (We) of the termination tab member (22) in the direction perpendicular to the welding direction so as to be not shorter than twice the diameter (D) of the shoulder members (12, 14).

The invention claimed is:

1. A friction stir welding method comprising:
joining together joining portions of a first member and a second member by a friction stir welding operation performed by moving a probe of a rotary tool in a welding direction, while rotating said probe in the form of a rod by rotation of said rotary tool together with two shoulder members which are provided on said probe so as to be spaced apart from each other by a predetermined distance in an axial direction of said probe, and applying a pressure to said joining portions through said two shoulder members, wherein said first and second members are formed of the same material or respective different materials selected from a group consisting of a cast aluminum alloy and 2000 series, 4000 series, 5000 series and 7000 series aluminum alloys;

disposing an initiation tab member consisting of a 1000 series, 3000 series, 6000 series or 8000 series aluminum alloy in abutting contact with end faces of said joining portions of said first and second members on the side of initiation of said friction stir welding operation wherein said initiation tab member is a planar member having a length not shorter than four times a diameter of said shoulder members, in the direction of welding by the rotary tool, and a width not shorter than twice the diameter of said shoulder members, in a direction perpendicular to the direction of welding; and moving said probe of said rotary tool into said joining portions of said first and second members through said initiation tab member to perform the friction stir welding operation with respect to said joining portions wherein a diameter of said probe of said rotary tool is not smaller than twice a thickness of said initiation tab member.

2. The friction stir welding method according to claim 1, wherein said joining portions of said first and second members are butted on each other to provide an abutting part, and said friction stir welding operation is performed with respect to the abutting part.

3. The friction stir welding method according to claim 1, wherein said joining portions of said first and second members are superposed on each other, and said friction stir welding operation is performed with respect to an overlapping part in which the joining portions are superposed on each other.

4. The friction stir welding method according to claim 1, wherein said rotary tool is a bobbin tool in which said two shoulder members are fixedly provided on said probe, with the predetermined distance therebetween.

5. The friction stir welding method according to claim 1, wherein said rotary tool is a self-reacting tool in which one of said two shoulder members is fixed to said probe, and the other of said two shoulder members is configured so as to be movable in the axial direction of said probe, so that said distance between said two shoulder members can be changed.

6. The friction stir welding method according to claim 1, further comprising:

disposing a termination tab member formed of a 1000 series, 3000 series, 6000 series or 8000 series aluminum alloy in abutting contact with end faces of said joining portions of said first and second members on the side of termination of said friction stir welding operation; and terminating said friction stir welding operation by successively moving said probe of said rotary tool from said joining portions of said first and second members into said termination tab member to form a continuous friction-stir-welded area extending across said joining portions and said termination tab member.

7. The friction stir welding method according to claim 6, wherein said termination tab member is a planar member having a length not shorter than four times a diameter of said shoulder members, in the direction of welding of said first and second members by said rotary tool, and a width not shorter than twice the diameter of said shoulder members, in a direction perpendicular to the direction of welding of said first and second members.

8. The friction stir welding method according to claim 6, wherein said termination tab member has a thickness not larger than a half of a diameter of said probe of said rotary tool.

* * * * *